United States Patent
Van Der Brug

(10) Patent No.: US 9,820,364 B2
(45) Date of Patent: Nov. 14, 2017

(12) United States Patent

(54) COMMISSIONING SYSTEM FOR A LIGHTING SYSTEM

(71) Applicant: PHILIPS LIGHTING HOLDING B.V., Eindhoven (NL)

(72) Inventor: Willem Peter Van Der Brug, Best (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/503,888

(22) PCT Filed: Jul. 23, 2015

(86) PCT No.: PCT/EP2015/066932
§ 371 (c)(1),
(2) Date: Feb. 14, 2017

(87) PCT Pub. No.: WO2016/023733
PCT Pub. Date: Feb. 18, 2016

(65) Prior Publication Data
US 2017/0245352 A1    Aug. 24, 2017

(30) Foreign Application Priority Data
Aug. 14, 2014  (EP) .................................... 14180933

(51) Int. Cl.
*H05B 37/02*    (2006.01)
*H05B 33/08*    (2006.01)
(Continued)

(52) U.S. Cl.
CPC ....... *H05B 37/0272* (2013.01); *H04B 10/116* (2013.01); *H04B 10/27* (2013.01); *H05B 33/0854* (2013.01)

(58) Field of Classification Search
CPC ......... H04B 10/27; H04W 8/005; H04Q 5/22; G08B 13/1427; H05B 37/0227; H05B 37/0272; H05B 33/08; H05B 33/0854
(Continued)

(56) References Cited

U.S. PATENT DOCUMENTS 7,307,542 B1    12/2007    Chandler et al.
8,729,834 B1    5/2014    Funderburk et al.
(Continued)

FOREIGN PATENT DOCUMENTS

EP    2315503 A2    4/2011
EP    2763508 A2    8/2014
(Continued)

*Primary Examiner* — Jimmy Vu

(57) ABSTRACT

A commissioning system (3) for a lighting system, the lighting system comprising a plurality of controllers (5), each controller (5) adapted to control a set of lighting units (7) spatially clustered as a group and controlled using a set of control outputs, wherein each control output is for controlling one or more lighting units of the set, the commissioning system comprising: an identification unit (31) for identifying the set of lighting units connected to a controller (5) from the plurality of controllers; a commissioning controller (33) for controlling the identified set of lighting units via the controller (5), wherein the commissioning controller is adapted to enable the controller (5) to: generate a control output signal for the set of lighting units to display a light output pattern; and for a lighting unit within the set, to generate a further control output signal, to change the light output pattern at the lighting unit to enable the lighting unit within the set to be visually identified; a commissioning unit (35) adapted to: receive as an input a position of the visually identified lighting unit within the set; and based on the position of the visually identified lighting unit within the set to assign a logical address to the visually identified lighting unit within the set.

11 Claims, 5 Drawing Sheets

(51) Int. Cl.
*H04B 10/116* (2013.01)
*H04B 10/27* (2013.01)

(58) Field of Classification Search
USPC .... 315/185 R, 112, 113, 117, 118, 151–153,
315/291, 307, 308, 312; 340/10.1–10.3,
340/10.31–10.34, 10.42, 572.3,
340/572.5–572.9
See application file for complete search history.

(56) References Cited

U.S. PATENT DOCUMENTS

| | | | |
|---|---|---|---|
| 9,210,759 B2* | 12/2015 | Reed | H05B 33/0854 |
| 2011/0031897 A1 | 2/2011 | Henig et al. | |
| 2011/0068900 A1 | 3/2011 | Billig et al. | |
| 2011/0122796 A1 | 5/2011 | Simons et al. | |
| 2011/0140864 A1 | 6/2011 | Bucci | |

FOREIGN PATENT DOCUMENTS

| | | |
|---|---|---|
| GB | 2418482 A | 3/2006 |
| WO | 2007034399 A1 | 3/2007 |
| WO | 2010035192 A1 | 4/2010 |
| WO | 2010097737 A1 | 9/2010 |
| WO | 2013057626 A2 | 4/2013 |
| WO | 2013057646 A1 | 4/2013 |

* cited by examiner

300

| Sequence number | UID | Relative position | Base_DMX_Address+ |
|---|---|---|---|
| 2 | 5068:05402675 | -3 | 0 |
| 3 | 5068:73581370 | +1 | 4 |
| 4 | 5068:35176186 | +2 | 5 |
| 5 | 5068:63576156 | 0 | 3 |
| 6 | 5068:63561783 | -2 | 1 |
| 7 | 5068:88429729 | -2 | 1 |
| 8 | 5068:24965675 | +1 | 4 |
| 9 | 5068:74510653 | 0 | 3 |
| 10 | 5068:60392354 | +1 | 4 |
| 11 | 5068:02659275 | +4 | 7 |
| 12 | 5068:86355973 | -1 | 2 |
| 13 | 5068:19057365 | +4 | 7 |
| 14 | 5068:56283957 | -3 | 0 |
| 15 | 5068:29378854 | +2 | 5 |
| 16 | 5068:88667243 | -3 | 0 |
| 17 | 5068:10067524 | +2 | 5 |
| 18 | 5068:77668449 | -1 | 2 |
| 19 | 5068:10003426 | +3 | 6 |
| 20 | 5068:43326668 | -2 | 1 |
| 21 | 5068:96544237 | -1 | 2 |
| 22 | 5068:63577652 | +3 | 6 |
| 23 | 5068:90637594 | +4 | 7 |
| 24 | 5068:65621764 | 0 | 3 |
| 25 | 5068:00098546 | +1 | 4 |
| 26 | 5068:34565854 | +3 | 6 |
| 27 | 5068:78245691 | +4 | 7 |
| 28 | 5068:89251855 | -3 | 0 |
| 29 | 5068:67585955 | -1 | 2 |
| 30 | 5068:78896745 | +2 | 5 |
| 31 | 5068:47204724 | +3 | 6 |
| 32 | 5068:22334355 | -2 | 1 |

COMMISSIONING SYSTEM FOR A LIGHTING SYSTEM

CROSS-REFERENCE TO PRIOR APPLICATIONS

This application is the U.S. National Phase application under 35 U.S.C. §371 of International Application No. PCT/EP2015/066932, filed on Jul. 23, 2015, which claims the benefit of European Patent Application No. 14180933.5, filed on Aug. 14, 2014. These applications are hereby incorporated by reference herein.

FIELD OF THE INVENTION

This invention is generally related to a commissioning system for a lighting system, and in particular a commissioning system for an arena or stadium lighting system.

BACKGROUND OF THE INVENTION

In high-end arena (field, pitch or stadium) lighting, like the Philips ArenaVision products, a large number of lighting units or luminaires are distributed around an arena or stadium to attempt to create a uniform light intensity on the field or pitch. For example a football stadium may have a lighting plan or design where the lighting system contains more than 100 luminaires, and typically 200 to 600 luminaires, each located on the stadium and with a desired aiming point on the pitch to attempt to provide a uniform lighting distribution. In stadiums and arenas the sports area is lit by so-called pitch lighting to create a well-lit environment. Typically the lighting system planner generates a light plan which contains for each luminaire information, such as the type of luminaire, the mounting location and orientation of the luminaire, and the aiming point (typically relative to the centre of the sports area). Furthermore the lighting plan can contain such information as how the luminaires are to be arranged relative to each other, how the luminaires are coupled to controllers (for example a wiring configuration) and furthermore how the controllers are coupled together (for example the wiring configuration of the controllers). This lighting plan attempts to generate the desired lighting effect.

Based on the lighting plan an installer mounts the luminaires in the stadium infrastructure. In this phase, the installer also has to direct the luminaire at the desired aiming location in the field using the lighting plan orientation values as defined in the lighting plan.

Having installed the luminaires it is then necessary to commission the lighting system. Commissioning of the lighting system involves determining logical connections between luminaires (and controllers). The commissioning operations may for example assign logical addresses to luminaires. The logical addresses enable the lighting system to employ dynamic effects and static lighting patterns as specific physical luminaires may be addressed by a (dynamic) scene controller via their logical addresses.

There are many methods for commissioning. One method is to label individual luminaires with bar code labels and register the connection of specific luminaires to scene controller output connections. This process is cumbersome, expensive and error-prone. Experiences with this method from other application areas (e.g. street lighting) indicate that the multitude of process steps (label generation, label application in factory, label scanning, assignment to controller output ID) causes up to 60% error rate in practical circumstances.

Other methods include visual commissioning. Existing methods have the problem that it is very difficult to identify the exact physical location of a specific luminaire in a long row, even when only a single luminaire is lit. For example it may be too difficult to count the luminaire number from a specific location within a circle of 300 luminaires. (e.g. the third to the right of the $14^{th}$ entrance in the stadium).

SUMMARY OF THE INVENTION

The above concerns are addressed by the invention as defined by the claims.

According to an embodiment of the invention, there is provided a commissioning system for a lighting system, the lighting system comprising a plurality of controllers, each controller adapted to control a set of lighting units spatially clustered as a group and controlled using a set of control outputs, wherein each control output is configured to control one or more lighting units of the set, the commissioning system comprising: an identification unit adapted to select one of the sets of lighting units connected to a controller from the plurality of controllers, and to identify the lighting units of the set by means of discovering unique identifiers associated with the drivers and/or lamps within each of said lighting units; a commissioning controller adapted to control the identified set of lighting units via the controller, wherein the commissioning controller is adapted to enable the controller to: generate a control output signal for the set of lighting units to display a light output pattern; and for a lighting unit within the set, to generate a further control output signal, to change the light output pattern at the lighting unit to enable a position of the lighting unit within the set to be visually identified; a commissioning unit adapted to: receive as an input a position of the visually identified lighting unit within the set; and based on the position of the visually identified lighting unit within the set to assign a logical address to each lighting unit within the set.

This system enables individual lighting units to be identified by requiring only their relative position within a set to be visually identified. The set may be a small number of lighting units compared to the overall lighting system, for example a set of 8 luminaires. By using the relative position within a set as the visual input, a reliable visual commissioning system can be created. The invention may make use of the physical wiring constraints (of controllers being associated with spatially grouped lighting units), so that visual identification can be based on relatively small lighting area.

The identification unit may be further adapted to select a further one of the sets of lighting units connected to a further controller, and to identify the lighting units of the further set by means of discovering unique identifiers associated with the drivers and/or lamps within each of said lighting units; and the commissioning controller may be further adapted to enable the further controller to: generate a control output signal for the further set of lighting units to display a light output pattern from the further lighting units; and for a lighting unit within the further set, to generate a further control output signal, to change a light output pattern at the lighting unit within the further set to enable the position of the lighting unit within the further set to be visually identified, such that the commissioning unit may be adapted to: receive as a further input a position of the visually identified lighting unit within the further set; and assign a logical address to the visually identified lighting unit within the further set.

The plurality of controllers may be connected together in a pre-defined order in accordance with a stored wiring plan, and the identification unit may be adapted to determine a connection order between the controller and the further controller by examining the stored wiring plan of the controllers, wherein the commissioning unit may be adapted to: further assign the logical address to the visually identified lighting unit within the further set based on the connection order and the position of the visually identified lighting unit within the further set. In such embodiments the control output ordering can be pre-defined or determined from examining the configuration of the wiring or wiring plan of the controllers.

The control output signal, to display the light output pattern for the set or further set of lighting units, may be a low light intensity static pattern control output signal. In such a system the low light intensity static pattern can be identified easily without dazzling the observer or monitor and allow easier detection of the second visual pattern.

The further control output signal, to change the light output pattern at the lighting unit to enable the lighting unit within the set or further set to be visually identified, may be a dynamic lighting pattern control output signal. In such a system the dynamic pattern, for example a blinking, can be easily identified and enable the observer or monitor to determine the relative location of the lighting unit within the first visual pattern actuated luminaires.

The set of lighting units may be connected together in a pre-defined order, and the identification unit may be further adapted to determine a connection order between the set or further set of lighting units by determining the wiring or couplings between lighting units of the set or further set; and the commissioning unit may further be adapted to: assign the logical address to the visually identified lighting unit within the set or further set further based on the connection order between the set or further set of lighting units. In such a manner by determining the wiring or couplings between the lighting units the logical addresses of the luminaires can be determined.

The input may comprise an image captured by a camera, wherein the commissioning unit may be adapted to process the image to determine the position of the visually identified lighting unit within the set.

The input may comprises a user input received from a separate device, the user input may comprise information of the position of the visually identified lighting unit within the set.

The logical address of the lighting unit may be control output address for the respective lighting unit. In other words by to assigning a logical address there is an allocation of a respect control output for the lighting unit within the set.

According to a second aspect there is provided a commissioning method for a lighting system comprising a plurality of controllers, each controller controls a set of lighting units spatially clustered as a group and controlled using a set of control outputs, wherein each control output is for controlling one or more lighting units of the set, the method being for mapping each lighting unit of the set to a respective logical address in dependence on the physical position of the lighting unit, the method comprising: selecting one of the sets of lighting units connected to a controller, and identifying the lighting units within the set by means of discovering unique identifiers associated with the drivers and/or lamps within each of said lighting units; controlling the identified lighting units to display a light output pattern; for a lighting unit within the set: changing the light output pattern to enable a position of that lighting unit within the set to be visually identified; and receiving a position of the visually identified lighting unit within the set as an input; and based on the position of the visually identified lighting unit within the set, assigning a logical address to the visually identified lighting unit within the set. This method enables individual lighting units to be identified by requiring only their relative position within a set to be visually identified. The set may be a small number of lighting units compared to the overall lighting system, for example a set of 8 luminaires. By using the relative position within a set as the visual input, a reliable visual commissioning system can be created. The invention makes use of the physical wiring constraints (of controllers being associated with spatially grouped lighting units), so that visual identification can be based on relatively small lighting area.

The commissioning method may further comprise: selecting a further set of lighting units connected to a further controller, and identifying the lighting units of the further set by means of discovering unique identifiers associated with the drivers and/or lamps within each of said lighting units; controlling the identified further set of lighting units connected to the further controller to display a light output pattern; for a further lighting unit within the further set: changing a light output pattern to enable a position of the further lighting unit to be visually identified; and receiving a position of the visually identified further lighting unit within the further set as an input; and further assigning a logical address to the visually identified further lighting unit based on the position of the visually identified further lighting unit within the further set.

The plurality of controllers may be connected together in a pre-defined order in accordance with a stored wiring plan, and the commissioning method may further comprise: determining a connection order between the controller and the further controller by examining the stored wiring plan of the controllers; wherein assigning the logical address to the visually identified further lighting unit within the further set comprises assigning the logical address to the visually identified further lighting unit based on the determined connections between each controller.

The light output pattern may be a low light intensity static pattern.

Changing the light output pattern to enable the lighting unit to be visually identified may comprise changing the light output pattern to a dynamic lighting pattern for the lighting unit.

The commissioning method may further comprise determining the connections between the set of lighting units; and wherein assigning a logical address to each lighting unit within the set may be further based on the connections between the set of lighting units.

Receiving the position of the visually identified lighting unit within the set as an input may comprise: receiving an image captured by a camera; and processing the image to determine the position of the visually identified lighting unit within the set.

Receiving the position of the visually identified lighting unit within the set as an input may comprise receiving a user input from a separate device, the user input comprising information of the position of the visually identified lighting unit within the set.

The set or further set of lighting units may be connected together in a pre-defined order, and the method may further comprise determining a connection order between the set or further set of lighting units by determining the wiring or couplings between the lighting units; and wherein assigning the logical address to each lighting unit within the set or further set may further comprise assigning the logical address to the visually identified lighting unit based on the connection order between the set or further set of lighting units.

According to a third aspect there is provided a commissioning system for a lighting system, the lighting system comprising a plurality of controllers, each controller adapted to control a set of lighting units spatially clustered as a group and controlled using a set of control outputs, wherein each control output is for controlling one or more lighting units of the set, the commissioning system comprising at least one processor and at least one memory including computer program code for one or more programs, the at least one memory and the computer program code configured to, with the at least one processor, cause the commissioning system at least to: identify the lighting units connected to a controller; control the identified lighting units to display a light output pattern; for a lighting unit within the set: change the light output pattern to enable that lighting unit within the set to be visually identified; and receive the position of the visually identified lighting unit within the set as an input; and based on the position of the visually identified lighting unit within the set, assign a logical address to the visually identified lighting unit within the set.

The commissioning system may be further configured to: identify a further set of lighting units connected to a further controller; control the identified further set of lighting units connected to the further controller to display the light output pattern; for a further lighting unit within the further set: change the light output pattern to enable the further lighting unit to be visually identified; and receive a position of the visually identified further lighting unit within the further set as an input; and further assign a logical address to the visually identified further lighting unit based on the position of the visually identified further lighting unit within the further set.

The commissioning system may be further configured to: determine a connection between the controller and the further controller based on a controller wiring configuration; wherein assigning a logical address to the visually identified further lighting unit within the further set may cause the commissioning system to assign a logical address to the visually identified further lighting unit based on the determined connections between each controller.

The light output pattern may be a low light intensity static pattern.

Changing the light output pattern to enable the lighting unit to be visually identified may cause the commissioning system to change the light output pattern to a dynamic lighting pattern for the lighting unit.

The commissioning system may be further caused to determine the connections between the set of lighting units; and wherein assigning a logical address to each lighting unit within the set may be further based on the connections between the set of lighting units.

Receiving the position of the visually identified lighting unit within the set as an input may cause the commissioning system to: receive an image captured by a camera; and process the image to determine the position of the visually identified lighting unit within the set.

Receiving the position of the visually identified lighting unit within the set as an input may cause the commissioning system to receive a user input from a separate device, the user input comprising information of the position of the visually identified lighting unit within the set.

The commissioning system may further be caused to determine a connection order between the set of lighting units; and wherein assigning a logical address to each lighting unit within the set may cause the system to assign a logical address to the visually identified lighting unit based on the connection order between the set of lighting units.

A computer program product comprising a computer-readable storage medium having computer-readable program code, when executed on at least one processor of a computer, may cause the computer to implement the steps of the method as described herein.

BRIEF DESCRIPTION OF THE DRAWINGS

Examples of the invention will now be described in detail with reference to the accompanying drawings, in which.

DETAILED DESCRIPTION OF THE EMBODIMENTS

The concepts as described herein show a commissioning system for a lighting system to enable an efficient determination of logical addresses to lighting units or luminaires within a complex lighting system. Although the following examples have been described with respect to stadium or arenas such as football stadium, it is understood that the commissioning system and methods described herein could be applied to various large scale lighting applications such as lighting for swimming pool arenas and velodromes.

Figure 1:
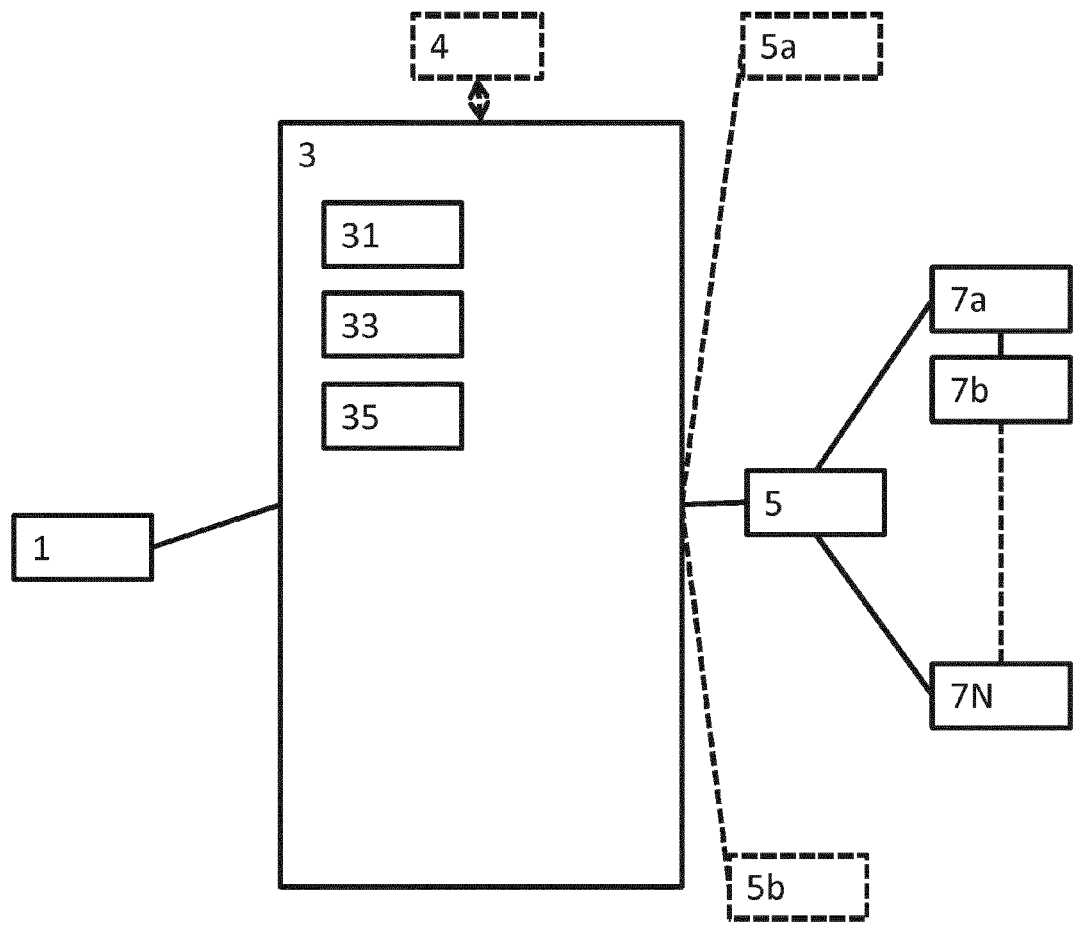
FIG. 1 shows schematically an example lighting system incorporating a commissioning system for a lighting system according to some embodiments.

With respect to FIG. 1 an example lighting system is shown incorporating a commissioning system for a lighting system according to some embodiments.

The lighting system may comprise lighting controllers 5, shown in FIG. 1 as three lighting controllers 5, 5a, 5b. The lighting controllers 5, 5a, 5b are each configured to control a clustered group (or set) of lighting units 7a, . . . 7N. It is understood that the controllers 5, 5a, 5b can be any suitable lighting controller implementation and may be configured to receive any suitable lighting protocol message or signal and generate any suitable control or lighting pattern signal to the group of luminaires to individually control each luminaire. Examples of lighting protocols include DMX, RDM and Art-Net.

In the example shown in FIG. 1 there are three controllers, however, it is understood that the number of lighting controllers may be fewer or greater than 3. The lighting controllers are further configured to be organised or configured according to a defined order. For example the controllers may be daisy chained together in a defined order. For example the order in which the controllers are daisy chained may be controller 5a, controller 5, and controller 5b. Each controller may be configured to control the operation of a determined number of lighting units or light sources. For example each controller may be configured to control 8 lighting units. However it is understood that each lighting controller 5, 5a, 5b may control any number of lighting units or light sources. In the example as described herein the controller is separate from the lighting units however the controller functionality may be distributed rather than be centralised. For example the group of lighting units or light sources may have integrated controller functionality in one or more of the lighting units.

The lighting system may further comprise light sources or lighting units 7. For example in some embodiments the lighting units 7 are LED Flood lighting units which can be dimmed. In some embodiments the lighting units 7 are coupled to the controller 5 and configured to receive light output control signals or visual pattern signals which affect at least one of the variable or adjustable elements of the lighting unit. For example the adjustable element of the lighting unit may be an intensity or brightness level. In the example shown in FIG. 1 only the daisy-chained group of lighting units associated with the controller 5 is shown. However it is understood that a typical arena pitch lighting system may comprise 300 light sources or lighting units arranged or grouped with a number of lighting units coupled to each controller. Each of the lighting units 7 can be directed or beamed to point at a determined portion of the arena or pitch. In some embodiments more than one light source or lighting unit may be directed or beamed at a specific determined portion of the arena or pitch in order to reduce the shadowing effect on the arena or pitch. The group of lighting units 7a to 7N are shown daisy-chained together. However it is understood that the lighting units may be wired or connected in any suitable manner. In some embodiments the wiring or connections between lighting units may be defined by the light output control signal or visual pattern signal message protocol. In some embodiments the lighting units may further comprise multiple and individually controllable light elements or lamps and lamp drivers. For example each lighting unit may comprise four light elements (lamps with associated lamp drivers), where each of these light elements can represent the colour components of the lighting unit. Thus a first light element may be associated with blue colour LEDs within the lighting unit, a second light element associated with red colour LEDs within the lighting unit, a third light element associated with green colour LEDs within the lighting unit, with a fourth light element associated with white LEDs within the lighting unit. The position of the light element in such an example may be defined as being the same and as such the same logical address would be determined for each of the light elements within the lighting unit. In other words these example light elements are addressed using a single logical address associated with the lighting unit but would be controlled when the lighting system is in operation based on the message protocol signal for the logical address.

The lighting system may further comprise a commissioning system 3 for a lighting system. The commissioning system 3 for a lighting system is configured to determine or assign logical addresses to each lighting unit within the lighting system.

In some embodiments the commissioning system 3 comprises an identification unit 31. The identification unit 31 is configured to discover or determine the set of lighting units connected to a controller. In some embodiments the identification unit 31 may be adapted to discover the unique identifiers associated with the drivers and/or lamps within the lighting units. For example lighting systems employing protocols such as RDM, Art-Net and DALI enable a unique identifier to be assigned or allocated to each lamp driver within the lighting unit. For RDM this unique identifier is a nonvolatile unique identifier, the RDM UID which can be discovered for each lamp driver. Furthermore for DALI systems the unique identifier is a 24 bit random number. These unique identifiers may then be stored. In some embodiments the lighting system lighting plan previously determines and stores the unique identifiers. In such embodiments the identification unit 31 may be adapted to retrieve the unique identifiers from memory associated with a controller.

In some embodiments of the commissioning system for a lighting system comprises a commissioning controller 33 for enabling the controlling of the identified set of lighting units by the controller 5. The commissioning controller 33 may be adapted to select a group of lighting units connected to a specific controller. In some embodiments the commissioning controller 33 may select a controller directly from the knowledge of the controller wiring order or connections between the controllers. However in some embodiments the commissioning controller 33 may receive the output of the identification unit 31. It is understood that in some embodiments the commissioning controller 33 may determine whether all of the groups of lighting units have been selected (or if all of the controllers 5 have been selected) and control the commissioning operation by systematically selecting controllers 5 or groups of lighting units 7 one at a time. The systematic selection of groups of lighting units can be based on any suitable selection method.

In some embodiments the commissioning controller 33 may further be adapted to generate a control output signal for the set of lighting units to display a light output pattern or in some embodiments to enable the controller to generate a control output signal for the set of lighting units to display a light output pattern. A control output signal may be output to the selected group of lighting units (or controller) to actuate the group of lighting units with the light output pattern. In some embodiments the light output pattern may be a low intensity light static pattern. A low intensity light static pattern provides a light intensity which can be easily observed or monitored but will not dazzle or overload the observer or monitor. An example light output control signal would be a 2% intensity visual pattern signal suitable for controlling the luminaire to produce static dimming at a level of 2% of full power.

In some embodiments the commissioning controller is further adapted to choose or select individual lighting units from the group of lighting units. The selection or choice of individual lighting units may be achieved by selecting individual unique identifiers associated with the individual lighting units. The choosing or selection may furthermore be according to any known pattern or order. For example the selection may be a random unique identifier selection order, or an increasing unique identifier selection, or a decreasing unique identifier selection. It is understood that in examples where there is more than one lighting element in each lighting unit then the selection of an individual lighting unit may be achieved by selecting each lighting element individually.

In some embodiments the commissioning controller is adapted to generate, or enable the controller to generate, a further control output signal for each lighting unit within the set. The controller 5 may then actuate each lighting unit with the further control output signal. In some embodiments the further control output signal is a dynamic light pattern signal. In other words a control output signal configured to enable the lighting unit to output a light pattern which can be easily observed or monitored over and above the background of the first visual pattern. For example the further light output control signal could be a blinking 50% intensity visual pattern signal.

In some embodiments the commissioning system comprises a commissioning unit 35 adapted to receive as an input a position of the visually identified lighting unit within the set. The input may therefore determine or enable the determination of the position of the individual lighting unit relative to the group of lighting units. In some embodiments the input is an image captured by a camera or optical sensor 1 directed with a field of view of the lighting units. The camera or optical sensor may monitor the lighting units. The commissioning unit in such embodiments may be adapted to apply computer vision methods or image processing of the captured image from the camera or optical sensor to determine the shape or configuration of the group of lighting units displaying the light output pattern and furthermore to determine the relative position of the individual lighting unit displaying the further light output pattern. In some embodiments the commissioning unit 35 may be adapted to receive a user input, for example from a portable or separate device carried by an observer observing the lighting units and identifying the relative position of the lighting unit displaying the further light output pattern relative to the lighting units displaying the lighting pattern.

In some embodiments the commissioning unit 35 may be configured to assign a logical address or allocate a respective control output to each lighting unit within the set based on the positions of all lighting units within the set. Furthermore the commissioning unit 35 may be configured to retrieve or determine information concerning the couplings between the individual lighting units to assist in the allocation of the respective control output to each lighting unit. The commissioning unit 35 may be adapted to allocate the respective control output, in the form of a logical address, to each lighting unit. In some embodiments this determined logical address can furthermore be associated with the unique identifier of the lamp or lighting unit and output and/or stored in any suitable format or manner. For example the commissioning unit 35 may be adapted to generate a commissioning data output in the form of a list or table which is passed to memory 4.

Figure 2:
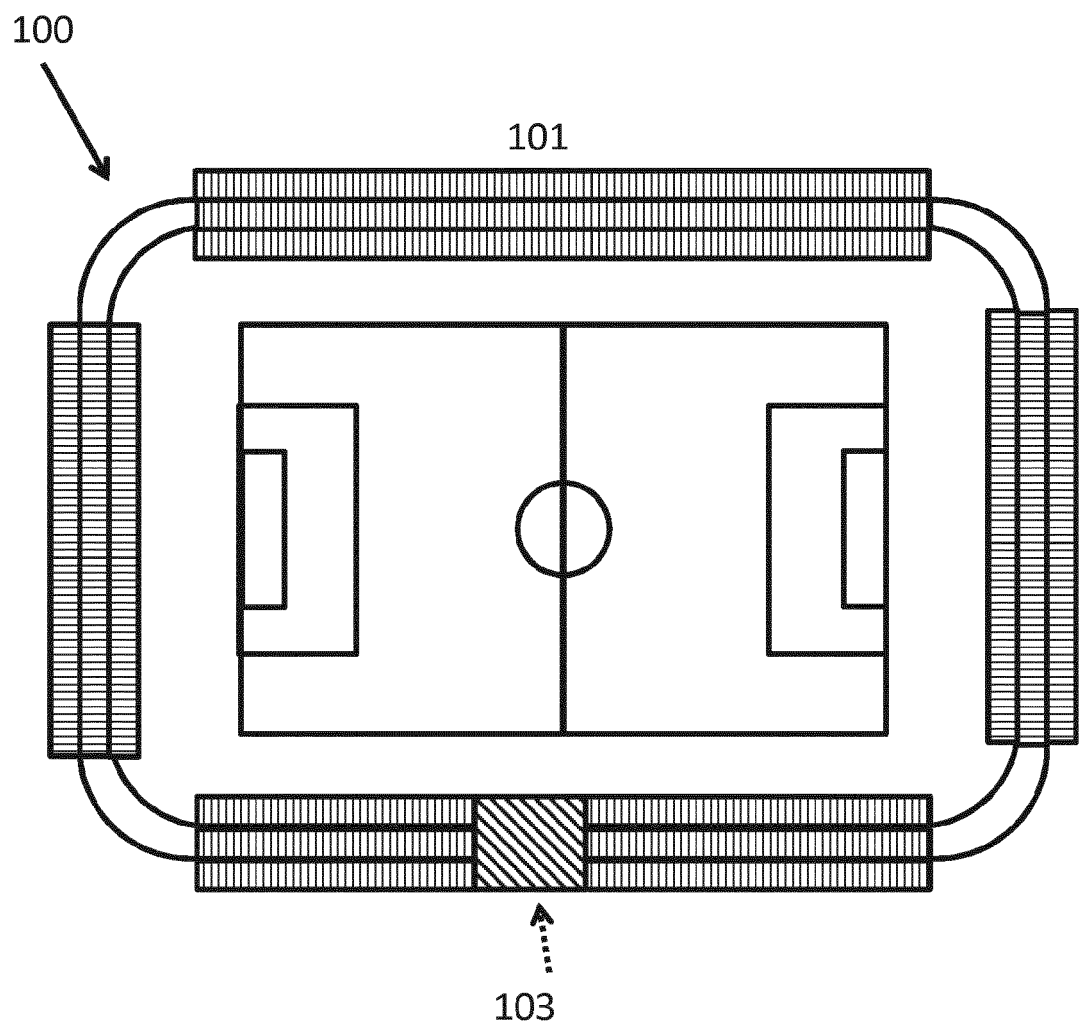
FIG. 2 shows schematically an example lighting system configuration within a stadium according to some embodiments.
Figure 3:
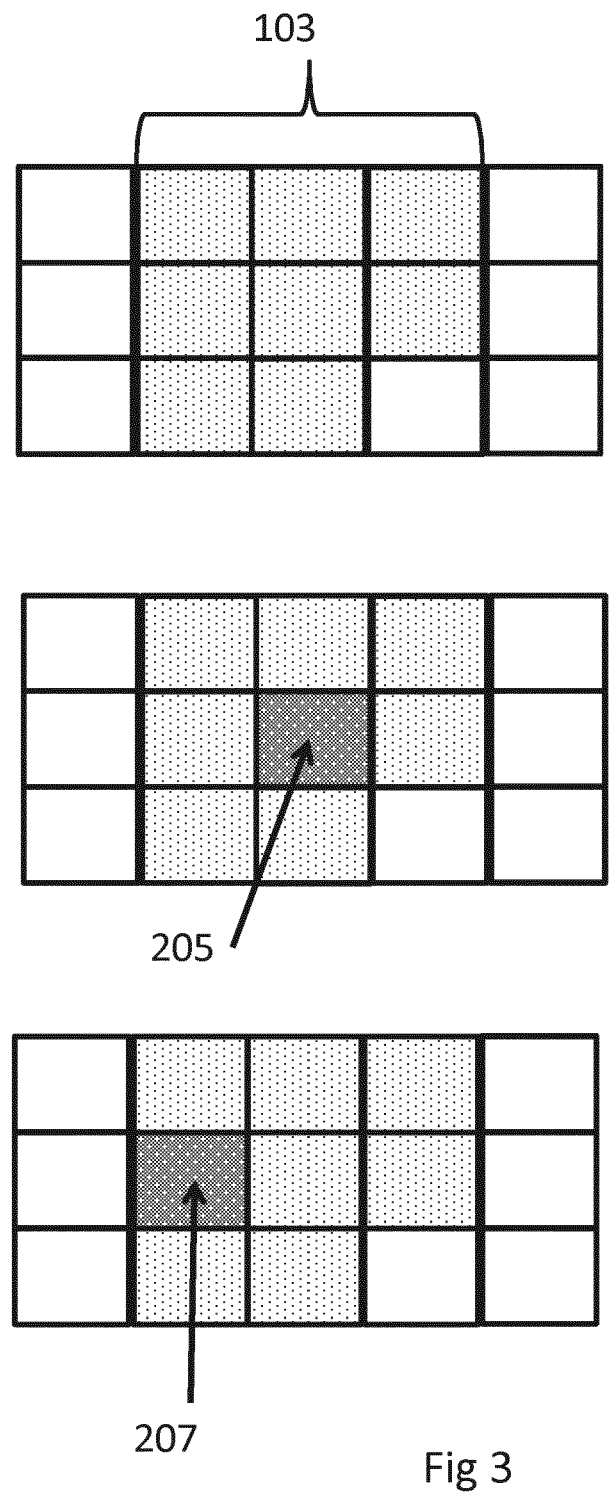
FIG. 3 shows schematically an example lighting system operating according to some embodiments.

With respect to FIGS. 2 and 3 an example commissioning system operation is shown according to some embodiments as discussed above. FIG. 2 for example shows an example stadium or arena 100, which in this example is a football stadium. Within the stadium 100 is shown with an arrangement or organisation of lighting units 101 located along the four sides of the football pitch. Furthermore FIG. 2 shows a clustered group (or block) of lighting units 103 located along one of the long sides of the stadium which are controlled by a single example controller. From FIG. 2 it can be seen that identifying the position of any one of the lighting units from the lighting system shown would be difficult.

With respect to FIG. 3 the example clustered group of lighting units 103 controlled by a single controller is shown with respect to the example commissioning system operations described herein. The first (upper) part of FIG. 3 shows the clustered group of eight lighting units 103 which have received the light output control signal and are displaying the light output pattern or visual pattern. The second (middle) part of FIG. 3 shows the clustered group of eight lighting units 103 which have received the light output control signal and furthermore an individual lighting unit 205 which has received the further light output control signal to change the light output pattern to enable the lighting unit within the set to be visually identified. The input to the commissioning unit 35 may be provided by a suitable observer or monitor. For example the input may be a user input indicating that the individual lighting unit 205 is located at position (2,2) relative to the lower left lighting unit in the set of lighting units. Similarly the input may be an image captured by a camera or optical sensor showing that the individual lighting unit is located at position (2,2). The third (lower) part of FIG. 3 shows the set or group of the lighting units 103 which have received the light output control signal and furthermore a further selected individual lighting unit 207 which has received the further light output control signal to change the light output pattern to enable the lighting unit within the set to be visually identified. In this example the input could be a user input indicating that the further individual lighting unit 207 is located at position (1,2) relative to the lower left lighting unit in the clustered group of lighting units. The example in FIG. 3 furthermore can be used to show the example where the individual lighting unit 205 is the initial selected individual lighting unit and is assigned the origin or reference location for the group. Thus individual lighting unit 205 may be defined as being at position (0,0) and the further individual lighting unit 207 may be defined as being at position (−1,−1). It is understood that any suitable positioning notation may be used.

Figure 4:
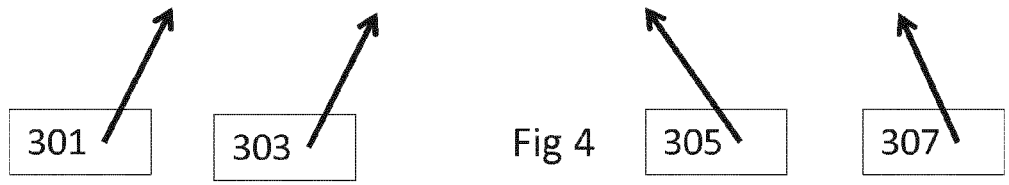
FIG. 4 shows schematically an example lighting system commissioning table according to some embodiments.

With respect to FIG. 4 an example control output association table or a logical address table 300 is shown. The table in FIG. 4 describes an example control output association table or a logical address table for 8 lamps or luminaires in one row. Such a table may be generated by the commissioning unit 35. The table 300 in this example shows the associations for a controller configured to control eight lighting units. Each lighting unit furthermore has four separate, individually controllable light elements each with their own unique identifier value (UID). In this example the table first column 301 shows the sequence number. The sequence number may be the individual lighting unit or light element selection order. The second column shows the light element unique identifier value (UID). The third column 305 shows the relative position of the selected individual lighting unit relative to the centre of the group. The fourth column 307 shows the logical address offset value. In the table shown in FIG. 4 the first individual lamp or lighting unit selected is used to determine the origin or reference position from which following selected lighting units or lamps can be determined. In this example the lighting units are spatially positioned from within the group from position −3 to position 0 to position +4. Thus the first or initial individual lighting unit selected is determined as having a zero or origin relative position. The second individual lighting unit selected, sequence number 2, has a relative position of −3, the third individual lighting unit selected has a relative position of +1, the fourth individual lighting unit selected has a relative position of +2, and the fifth individual lighting unit has a relative position of zero. In other words the fifth individual lighting unit (or light element) is located at the same position or location as the first one (and therefore within the same enclosure as the first individual lighting unit selected). In this example the lighting units, are ordered according to their relative position in other words that the lighting units are wired up in a daisy-chained from controller to relative position −3, relative position −3 to relative position −2, relative position −2 to relative position −1 and so on to relative position +4 to the controller. The commissioning unit may then generate a control output offset value based on the relative position and information on the connection of the lighting units such that the address offset can be generated by adding 3 to the relative position value. Thus the control output offset address for a lighting unit at relative position −3 is 0, the offset address for a lighting unit at relative position −2 is 1 and so on until the offset address for a lighting unit at relative position +4 is 7.

Figure 5:
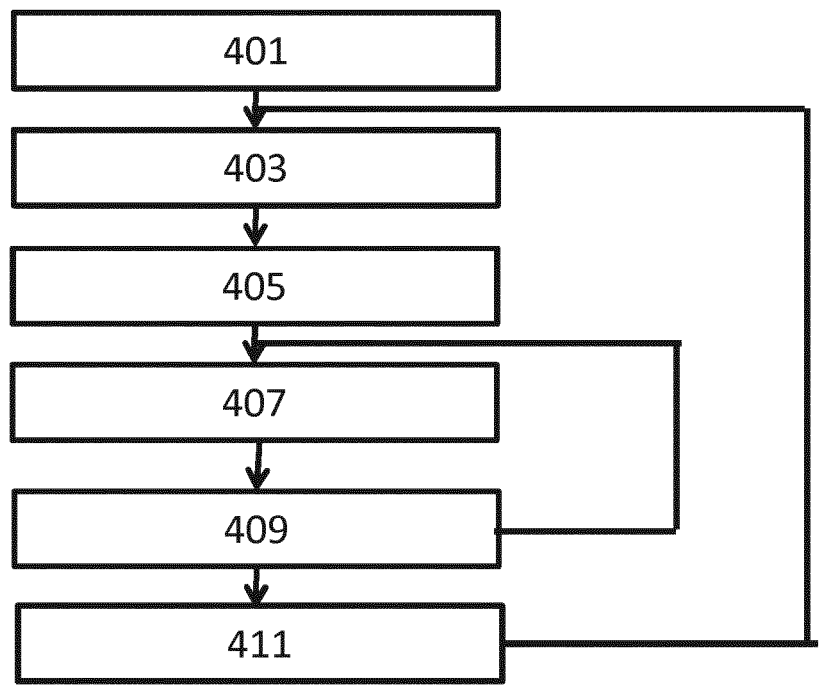
FIG. 5 shows a flow diagram of a method of commissioning the lighting system as shown with respect to FIGS. 1 to 4 according to some embodiments.

With respect to FIG. 5 an example flowchart of the operations of the commissioning system 3 is shown in further detail.

As described herein a first optional operation is to identify the lighting units connected to all of the controllers. This in other words is determining the unique identification values for the light elements within the lighting units.

The operation of identifying all of the lighting units in the lighting system is shown in FIG. 5 by step 401.

The commissioning system 3 may then select a controller or identify the lighting units connected to a controller.

The operation of identifying the lighting units connected to a controller is shown in FIG. 5 by step 403.

The commissioning system 3 may then control the identified lighting units to display a light output pattern.

The operation of controlling the identified lighting units to display a light output pattern is shown in FIG. 5 by step 405.

The commissioning system may furthermore then for each lighting unit within the set, in turn, change the light output pattern to enable that lighting unit within the set to be visually identified.

The operation of changing the light output pattern to enable that lighting unit within the set to be visually identified is shown in FIG. 5 by step 407.

The commissioning system may furthermore then for each lighting unit within the set receive the position of the visually identified lighting unit within the set as an input.

The operation of receiving the position of the visually identified lighting unit within the set as an input selecting an individual lighting unit is shown in FIG. 5 by step 409.

A loop is shown between step 409 and 407 in FIG. 5 to demonstrate the changing the light output pattern and receiving the position of each lighting unit.

The commissioning system may furthermore assign a logical address or allocate a respective control output to each lighting unit within the set based on the positions of all lighting units with the set.

The operation of allocating a respective control output to each lighting unit within the set based on the positions of all lighting units with the set is shown in FIG. 5 by step 411.

The commissioning system may then repeat the above steps from 403 to 411 for all of the controllers, or sets of lighting units controlled by the controllers as shown by the further loop from step 411 to 403.

Furthermore in general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope. In the device claim enumerating several means, several of these means may be embodied by one and the same item of hardware. The mere fact that certain measures are recited in mutually different dependent claims does not indicate that a combination of these measures cannot be used to advantage. Furthermore in the appended claims lists comprising "at least one of: A; B; and C" should be interpreted as (A and/or B) and/or C.

The invention claimed is:

1. A commissioning system for a lighting system, the lighting system comprising a plurality of controllers, each controller adapted to control a set of lighting units spatially clustered as a group and controlled using a set of control outputs, wherein each control output is configured to control one or more lighting units of the set, the commissioning system comprising:

an identification adapted to select one of the sets of lighting units connected to a controller from the plurality of controllers, and to identify the lighting units of the set by means of discovering unique identifiers associated with the drivers and/or lamps within each of said lighting units;

a commissioning controller adapted to control said identified set of lighting units via the controller, wherein the commissioning controller is adapted to enable the controller to:
generate a control output signal for the set of lighting units to display a light output pattern; and
for a lighting unit within the set, to generate a further control output signal, to change the light output pattern at the lighting unit to enable a position of the lighting unit within the set to be visually identified;
a commissioning unit adapted to:
receive as an input a position of the visually identified lighting unit within the set; and
based on the position of the visually identified lighting unit within the set to assign a logical address to the visually identified lighting unit within the set;
wherein the identification unit is further adapted to select a further one of the sets of lighting units connected to a further controller, and to identify the lighting units of the further set by means of discovering unique identifiers associated with drivers and/or lamps within each of said lighting units; and the commissioning controller further adapted to enable the further controller to control the identified further set of lighting units to:
generate a control output signal for the further set of lighting units to display a light output pattern from the further set of lighting units; and
for a lighting unit within the further set, to generate a further control output signal, to change a light output pattern at the lighting unit within the further set to enable a position of the lighting unit within the further set to be visually identified, such that the commissioning unit is adapted to: receive as a further input a position of the visually identified lighting unit within the further set; and assign a logical address to the visually identified lighting unit within the further set;
wherein the plurality of controllers are connected together in a pre-defined order in accordance with a stored wiring plan, and wherein the identification unit is adapted to determine a connection order between the controller and the further controller based by examining the stored wiring plan of the controllers, wherein the commissioning unit is adapted to further assign the logical address to the visually identified lighting unit within the further set based on the connection order and the position of the visually identified lighting unit within the further set.

2. The commissioning system as claimed in claim 1, wherein the control output signal, to display the light output pattern for the set of lighting units, is a low light intensity static pattern control output signal.

3. The commissioning system as claimed in claim 1, wherein the further control output signal, to change the light output pattern at the lighting unit to enable the lighting unit within the set or further set to be visually identified, is a dynamic lighting pattern control output signal.

4. The commissioning system as claimed in claim 1, wherein the set of lighting units are connected together in a pre-defined order, and wherein the identification unit is further adapted to determine a connection order between the lighting units of the set by determining the wiring or couplings between lighting units; and the commissioning unit is further adapted to: assign the logical address to the visually identified lighting unit within the set further based on the connection order between the set of lighting units.

5. The commissioning system as claimed in claim 1, wherein the input comprises an image captured by a camera, wherein the commissioning unit is adapted to process the image to determine the position of the visually identified lighting unit within the set.

6. The commissioning system as claimed in claim 1, wherein the input comprises a user input received from a separate device, the user input comprising information of the position of the visually identified lighting unit within the set.

7. The commissioning system as claimed in claim 1, wherein the logical address is a control output address for the respective lighting unit.

8. A commissioning method for a lighting system comprising a plurality of controllers, each controller controls a set of lighting units spatially clustered as a group and controlled using a set of control outputs, wherein each control output is for controlling one or more lighting units of the set, the method being for mapping each lighting unit of the set to a respective logical address in dependence on the physical position of the lighting unit, the method comprising:
selecting one of the sets of lighting units connected to a controller, and identifying the lighting units within the set by means of discovering unique identifiers associated with drivers and/or lamps within each of said lighting units;
controlling the identified lighting units to display a light output pattern;
for a lighting unit within the set:
changing the light output pattern to enable a position of that lighting unit within the set to be visually identified; and
receiving a position of the visually identified lighting unit within the set as an input; and
based on the position of the visually identified lighting unit within the set, assigning a logical address to the visually identified lighting unit within the set;
the method further comprising:
selecting a further set of lighting units connected to a further controller, and identifying the lighting units of the further set by means of discovering unique identifiers associated with drivers and/or lamps within each of said lighting units;
controlling the identified further set of lighting units connected to the further controller to display a light output pattern; and
for a further lighting unit within the further set:
changing a light output pattern to enable a position of the further lighting unit to be visually identified; and
receiving a position of the visually identified further lighting unit within the further set as an input; and
further assigning a logical address to the visually identified further lighting unit based on the position of the visually identified further lighting unit within the further set;
wherein the plurality of controllers are connected together in a pre-defined order in accordance with a stored wiring plan, the method further comprising:
determining a connection order between the controller and the further controller by examining the stored wiring plan of the controllers;
wherein assigning the logical address to the visually identified further lighting unit within the further set comprises assigning the logical address to the visually identified further lighting unit further based on the determined connection between the controller and the further controller.

9. The commissioning method as claimed in claim 8, wherein the light output pattern is a low light intensity static pattern.

10. The commissioning method as claimed in claim 8, wherein changing the light output pattern to enable the lighting unit to be visually identified comprises changing the light output pattern to a dynamic lighting pattern for the lighting unit.

11. The commissioning method as claimed in claim 8, wherein the set of lighting units are connected together in a pre-defined order, the method further comprising determining the connection order between the lighting units of the set by determining the wiring or couplings between the lighting units; and wherein assigning the logical address to the visually identified lighting unit within the set is further based on the connections between the set of lighting units.

* * * * *